United States Patent [19]

Strunk

[11] 3,881,045

[45] Apr. 29, 1975

[54] OFFSET PRINTING BLANKET

[75] Inventor: David W. Strunk, Glocester, R.I.

[73] Assignee: E. I. du Pont de Nemours and Company, Wilmington, Del.

[22] Filed: July 24, 1973

[21] Appl. No.: 382,174

[52] U.S. Cl. .............. 428/215; 156/308; 156/315; 260/830; 428/250; 428/287; 428/248; 428/909
[51] Int. Cl. ............................................. B41m 9/02
[58] Field of Search ........... 161/88, 92, 94, 95, 160, 161/167, 401, 151, 231; 156/307, 308, 314, 315; 101/401.2, 401.3

[56] References Cited
UNITED STATES PATENTS

| | | | |
|---|---|---|---|
| 2,792,321 | 5/1957 | Fredericks | 161/401 |
| 2,792,322 | 5/1957 | Fredericks | 161/401 |
| 3,718,531 | 2/1973 | Lewis | 161/401 |
| 3,795,568 | 3/1974 | Rhodarmer et al. | 161/401 |

Primary Examiner—George F. Lesmes
Assistant Examiner—James J. Bell

[57] ABSTRACT

An offset printing blanket which is a laminate of
 A. a void-free layer of an elastomeric material firmly adhered to
 B. a high modulus film such as a polyester film which is firmly adhered to
 C. a soft, highly resilient void-free rubber layer which is adhered to
 D. a fibrous backed sheet such as a woven fabric, a non-woven fabric or a spun bonded non-woven fabric; optionally, the fabric can be omitted and a pressure sensitive adhesive can be used as a backing;
the blanket has a specific modulus of elasticity, Bayshore resilience and permanent set to provide for high quality printing and a blanket that is resistant to deformation upon use and is resistant to creasing caused by smashes that occur in the printing operation.

11 Claims, 1 Drawing Figure

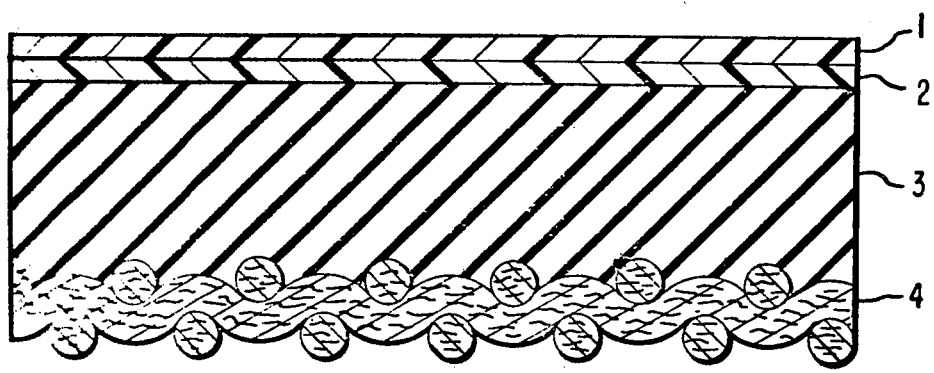

OFFSET PRINTING BLANKET

BACKGROUND OF THE INVENTION

This invention is directed to laminates and in particular a laminate which is utilized as a printing blanket by the printing industry.

Printing blankets currently used in the industry comprise three or more fabric plies having a top layer of a soft rubber. These blankets have a good dimensional stability, however, the blanket can be easily ruined when several sheets of paper go through the printing press at once. This is commonly known in the industry as a "smash." The multiple fabric ply construction of conventional blankets is not sufficiently resilient to a smash and the blanket will permanently set and wrinkle thereby rendering the the blanket useless for printing. Also, after extended use, conventional blankets tend to compress and do not give effective printing. There is a need in the printing industry for a printing blanket which has an excellent top surface for printability, has excellent stability while in use on the printing press, is resistant to smashes and does not compress under extended use.

The novel printing blanket of this invention has these properties and provides for an improved balance of solid printed areas and halftone printed areas.

SUMMARY OF THE INVENTION

An offset printing blanket that is a laminate of
A. 3–10 mils of a void-free printing layer of an elastomeric material that has a Shore A hardness of 30–60 durometer and which is firmly adhered to
B. a polyester film about 2–6 mils in thickness that has a tensile strength of 20,000 to 180,000 pounds per square inch which is firmly adhered to
C. a soft, highly resilient void-free rubber backing layer about 20 to 65 mils thick which is in firm adherence to
D. a fibrous backing sheet or a pressure sensitive adhesive backing;
wherein the blanket has a modulus elasticity of $1-4 \times 10^{-7}$ dynes/cm., and the Bayshore Resilience of 30–50 percent measured according to ASTM-D-2632-27 and a permanent set of 1–3 percent measured according to ASTM-395-61, Method A.

A process for preparing the above printing blanket is also part of this invention.

BRIEF DESCRIPTION OF THE DRAWING

The drawing illustrates the novel printing blanket in which the printing layer of an elastomeric material 1 is adhered to a polyester film 2 which is firmly adhered to the soft highly resilient rubber backing layer 3 and the rubber backing layer is adhered to a fibrous backing sheet 4.

DESCRIPTION OF THE INVENTION

The novel product of this invention is a laminate which is utilized as a printing blanket for an offset printing press. The product comprises a soft resilient printing layer, a polyester film which provides resistance to the blanket taking a permanent set, a soft, highly resilient layer and a fibrous backing or a pressure sensitive adhesive backing. The resulting product has the following physical properties:

a modulus of elasticity of $1-4 \times 10^{-7}$ dynes/cm.;

a Bayshore resilience of 30–50 percent measured according to ASTM-D-2632-27;

a permanent set of 1–3 percent measured according to ASTM-395-61, Method A.

The elastomeric material utilized as the printing layer preferably is an acrylonitrile/butadiene copolymer. The layer is a void-free layer which readily transfers ink and is about 3–10 mils in thickness, preferably about 4–6 mils in thickness. The elastomeric material should have a Shore A hardness of about 30–60 durometer, a tensile strength of 1,000–3,000, pounds per square inch and an elongation at break of 400 to 900 percent.

One preferred acrylonitrile/butadiene copolymer contains 22–42 percent acrylonitrile and corespondingly 58–88 percent of butadiene and has a plasticity of 30 to 115 Mooney units.

An epichlorohydrin elastomer can also be used as the printing layer. These epichlorohydrin rubbers can be 100 percent of epichlorohydrin or can contain up to 50 percent of ethylene oxide. One useful epichlorohydrin rubber contains about 65 percent epichlorohydrin and 35 percent ethylene oxide.

Other elastomers that can be used for the printing layer are polyurethane elastomers, polychloroprene, acrylonitrile/epichlorohydrin elastomers, polysulfide rubbers and the like.

This layer can contain pigment such as titanium dioxide, carbon black, zinc oxide, filler pigment such as clay, anti-oxidants such as 2,2-methylene-bis-(4-methyl-6,6-tertiary butyl phenol), accelerators such as methyl thiuram monosulfide, agents such as sulfur which are conventionally used in elastomeric compositions.

A high modulus film is utilized under the printing layer of the novel printing blanket and provides the blanket with resistance to creasing and deformation due to smashes that occur in the printing operation. The film should be about 2–6 mils in thickness and have a tensile strength of 20,000 to 180,000 psi. Preferably, the film is about 3–5 mils thick and has a tensile strength of 50,000 to 120,000 psi. Preferably, a polyester film is used such as polyethylene terephthalate but other high modulus films can be used for this purpose.

To obtain adhesion of the elastomeric printing layer and the resilient substrate to the film, it is preferable to treat the film with an adhesion promoting process such as flame treatment or corona discharge treatment. These treatments are particularly useful for polyester films such as polyethylene-terephthalate films. Matt finish polyester films can be used without an adhesion promoting treatment.

It is preferred to coat the high modulus film on both sides with a high quality primer to obtain improved adhesion of the printing layer and the resilient backing layer. One preferred primer comprises a mixture of polymeric materials in organic solvents.

The soft, highly resilient void-free rubber backing layers of 20 to 65 mils in thickness, preferably, 20–40 mils in thickness absorbs the shock and compression forces which the printing blanket is subjected to in a conventional printing process. This layer is calendered or laminated onto the high modulus film. Any of the aforementioned rubbers and elastomers for the printing layer can also be for this resilient backing layer. Preferably, an epichlorohydrin/ethylene oxide copolymer is used. Any of the aforementioned antioxidants, accelerators, pigments and curing agents are used in this resilient layer.

The backing on the printing blanket of this invention can be a fibrous material or pressure sensitive adhesive. Woven fabrics and non-woven fabrics can be utilized. Typically, twills, drills, ducks and other types of weaves of natural fibers such as cotton and rayon can be used, and also synthetic fibers of nylon, polyester, polypropylene and the like or blends of fibers can be utilized. Also, non-woven fabrics of natural or synthetic fibers can be used. Non-woven spun bonded fabrics of polyester or polyolefins such as polypropylene or polyethylene can be used as the backing material. One preferred fabric is a non-woven spun bonded polyester fabric. The backing material provides strength to the printing blanket and also provides a surface which reduces slippage of the printing blanket on the roll in the printing press.

For some printing applications, such as an office copying machine, a pressure sensitive adhesive is used as a backing in place of the fabric layer. Typical pressure sensitive adhesives that can be used are those based on natural or synthetic elastomers modified with various resins and other compounding agents. These pressure sensitive adhesives can be applied as a latex or a solvent or the adhesive can be transferred from a release paper to the back of the printing blanket.

To firmly adhere the multiple layers of the printing blanket together, a cement can be used. One preferred cement composition is a blend of polyepichlorohydrin rubber and an epoxy hydroxy polyether resin such as "Epon" 828, and amine and a curing agent such as 2-mercaptoimidazoline. Cements based on any of the aforementioned elastomers and rubbers also can be used.

The novel blanket can be prepared in a variety of methods. That is, the blanket can be laminated together in any desirable procedure. However, the following method is preferred: the polyester film is coated on both sides with a primer composition which is allowed to dry and then the elastomeric printing layer is calendared onto one side of the polyester film; then a second laminate is prepared by coating the fabric with a cement composition which is then dried and the highly resilient rubber backing layer is calendared onto the cement coated side of the fabric; the cement can be applied either to the resilient layer of the coated fabric or to the primer coated polyester film side of the laminate or to both layers and then the blanket is formed by laminating the above two prepared laminates together at a pressure of about 15 to 100 pounds per square inch for about 2–20 minutes at about 125°–250°C.

The following Examples illustrate the invention. All parts and percentages are on a weight basis unless otherwise indicated.

EXAMPLE 1

An elastomeric composition is prepared by milling together the folowing ingredients:

| | Parts By Weight |
|---|---|
| Acrylonitrile/butadiene copolymer (having acrylonitrile content 22% to 42% and a corresponding amount of butadiene and having a plasticity of about 30 to 115 Mooney units determined by using a large rotor and a 4-minute warming time at 100°C.) | 100.0 |
| Stearic acid flake | 1.0 |
| Titanium dioxide pigment | 10.0 |
| Carbon black pigment | 2.0 |
| Crown clay | 60.0 |
| Zinc oxide | 5.0 |
| Antioxidant - 2,2-methylene-bis-(4-methyl-6,6-tertiary butyl phenol) | 1.0 |
| Sulfur | 1.7 |
| Dibutoxyethyl phthalate | 30.0 |
| Mercaptobenzylthiozal disulfide | .1.7 |
| Tetramethyl thiuram Monosulfide | 0.1 |
| Total | 212.5 |

The above ingredients are milled together for 12 minutes while maintaining a temperature of about 50°C. The resulting topcoating composition after being press cured for 7 minutes at 175°C. has the following physical properties:

| | |
|---|---|
| Hardness Shore A | - 30 to 60 durometer |
| Tensile strength | - 1000 to 3000 psi |
| Per Cent elongation at break | - 400 to 900. |

The following two primer compositions are prepared as follows:

| Primer No. 1 | | Parts By Weight |
|---|---|---|
| "Chemlok" 205 (a mixture of a polymer organic compounds and minerals in methylethyl ketone and "Cellosolve" solvent system) | | 200 |
| Methylethyl ketone | | 600 |
| | Total | 800 |
| Primer No. 2 | | |
| "Chemlok" 220 (a mixture of polymers perchloroethylene solvent system) | | 1 and dispersed fillers in xylene and 200 |
| Toluene | | 600 |
| | Total | 800 |

The ingredients for each of the primers are blended together to form the primer compositions.

The resilient rubber composition is as follows:

|  | Parts By Weight |
|---|---|
| "Hydrin" 200 - elastomer (copolymer of epichlorohydrin and ethylene oxide having the recurring structural unit of 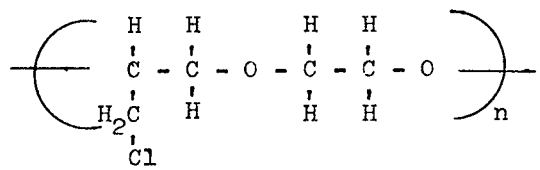 and having a specific gravity of 1.27 | 100.0 |

|  | Parts By Weight |
|---|---|
| Zinc stearate | 1.0 |
| Red Lead pigment | 5.0 |
| Antioxidant (trimethyl dihydroquinoline polymerized) | 2.0 |
| Carbon black pigment | 40.0 |
| Plasticizer (dibutoxyl-ethoxy-ethyl, formal) | 15.0 |
| Synthetic waxes | 1.0 |
| Accelerator (ethylenethiourea-80% in oil) | 1.5 |
| Total | 165.5 |

The above ingredients are milled together while maintaining a temperature of about 80°–105°C. The resulting composition has a resiliency of 45 and a Shore A hardness of 57–58 durometer.

An adhesive composition is prepared as follows:

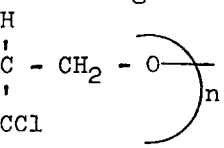

|  | Parts By Weight |
|---|---|
| Hydrin 100 (polyepichlorohydrin having the recurring unit shown above and having a specific gravity of 1.36) | 100.0 |
| Antioxidant (trimethyl dihydroquinoline - polymerized) | 1.0 |
| Maglite (magnesium oxide) | 2.0 |
| Carbon black pigment | 40.0 |
| Cabosil M-5 (Fume silica) | 5.0 |
| Di-(2-ethylhexyl phthalate) | 10.0 |
| Tackifier (glycerol ester of rosin) | 1.0 |
| Synthetic waxes | 0.5 |
| Total | 159.5 |

The above ingredients are blended together to form an adhesive composition.

The following cement composition is then prepared utilizing the above adhesive:

|  | Parts By Weight |
|---|---|
| Adhesive composition (prepared above) | 25.0 |
| Methylethyl ketone | 75.0 |
| "Epon" 828 (epoxyhydroxy polyether resin, having a Gardner Holdt viscosity of 100–160 poises and an epoxide equivalent of 180–195) | 2.4 |
| Triethylenetetraamine | 0.47 |
| Accelerator (ethylene thiourea) | 0.24 |
| Total | 103.11 |

The above ingredients are thoroughly blended together to form a cement composition.

The printing blanket is prepared by forming two plies and then laminating these two plies together to form the printing blanket.

A cotton duck fabric having a weight of 8.06 ounces per square yard is coated on one side with the above prepared cement composition by applying the cement with a wirewound rod. To the cement coated side of the cotton duck cloth, a resilient rubber layer is calendared onto the cloth using the above prepared resilient rubber composition. The resulting ply is cured in a Rotocure press for 5 minutes at 175°C. and 700 pounds per square inch pressure. The resulting layer after cure is about 52 mils in thickness.

A second ply is prepared by coating a 5 mil polyethylene terephthalate film with primer No. 1 prepared above using a No. 35 wirewound rod and the primer is air dried. A layer of the primer No. 2 is similarly applied and allowed to air dry. Onto the primed surface of the film, a 5 mil layer of the above prepared elastomeric composition is applied by calendaring the composition onto the primed polyethylene terephthalate.

The plies are then laminated together. The polyethylene terephthalate surface of the above prepared ply is coated with a thin layer of the above cement and the resilient surface of the first prepared ply is also coated with the aforementioned cement composition. These two plies are then laminated in a continuous type press at 15–25 psi for 7 minutes at 175°C. to provide a high quality printing blanket.

The printing blanket has a modulus of elasticity of $1.3 \times 10^{-7}$ dynes per sq. centimeter, a Bayshore resilience of 37% measured according to ASTM-D-2632-67 and permanent set of 2.7 percent measured according to ASTM-395-61, Method A.

The printing blanket is utilized in an offset printing press and provides a blanket which is durable, does not take a permanent set from "smashes" in the printing process and gives quality printing and particularly high quality half tone effects.

EXAMPLE 2

An elastomeric composition is prepared by milling together the following ingredients:

| Portion 1 | Parts By Weight |
|---|---|
| Acrylonitrile/Butadiene copolymer (described in Example 1) | 50.00 |
| Stearic acid flake | 0.50 |
| Titanium dioxide pigment | 5.00 |
| Carbon black pigment | 1.00 |
| Crown clay | 30.00 |
| Zinc oxide | 2.50 |
| Antioxidant [methylene-bis(4-methyl-6,6-tertiary butyl phenol)] | 0.50 |
| Sulfur | 0.85 |
| Dibutoxyethyl phthalate | 15.00 |
| Portion 2 | |
| 2,2-Dithio-bis-(benzothiozol) | 0.85 |
| Tetramethyl thiuram monosulfide | 0.05 |
| Total | 106.25 |

Portion 1 is charged into a standard mill and the ingredients are milled together for 30 minutes while maintaining the temperature at 50°C., and then Portion 2 is added and is thoroughly milled into the composition.

The resulting composition after being press cured for 7 minutes at 175°C. has the following physical properties:

| | |
|---|---|
| Hardness, Shore A | - 40 |
| Tensile strength | - 1050 psi |
| Per Cent elongation at break | - 500. |

A resilient rubber composition is prepared as follows:

| | Parts By Weight |
|---|---|
| Acrylonitrile/butadiene copolymer (described in Example 1) | 100.00 |
| Semi-reinforcing furnace carbon black pigment | 90.00 |
| Dibutyl phthalate | 17.00 |
| Terpine-derived synthetic polymer | 7.00 |
| Stearic acid flake | 1.20 |
| Zinc oxide pigment | 11.75 |
| Sulfur | 1.25 |
| 2,2-Dithio-bis-(benzothiazole) | 1.00 |
| Total | 229.20 |

The above ingredients are milled together while maintaining a temperature of about 80°–105°C. The resulting composition has about the same physical properties as the resilient rubber composition prepared in Example 1.

A printing blanket is prepared by coating both sides of a 5 mil polyethylene terephthalate film using wire wound rolls with "Chemlok" 205 described in Example 1. A standard coating tower is used in which the film is traveling at a rate of 6 yards per minute and the tower is at a temperature of 95°c.

The above prepared elastomeric composition is then calendered onto one side of the above primed polyethylene terephthalate film providing a layer about 5 mils in thickness. Onto the opposite side of the film, a 25 mil thick layer of the resilient rubber composition prepared above is calendered. The resulting product has a thickness of about 35–36 mils. The product is then Roto cured for 9 minutes at 170°C. and 20 psi to provide a high quality printing blanket.

A release paper coated with a pressure sensitive adhesive transfer tape is then applied to the resilient rubber layer of the blanket and then the blanket is passed over a rotating drum. The pressure sensitive adhesive is a synthetic elastomer modified with resins and compounding agents. Before the printing blanket is used, the release paper from the pressure sensitive tape is removed and the blanket is adhered to the drum on the printing press or duplicating machine.

The resulting printing blanket has modulus of elasticity of about $3.2 \times 10^{-7}$ dynes per square centimeter, a Bayshore resilience of 39 percent, and a permanent set of 2.5 percent.

The printing blanket is used in a duplicating machine for business forms and provides a blanket which is durable, does not take a permanent set from "smashes" in the printing process and gives quality printing and in particular high quality half tone effects.

EXAMPLE 3

A printing blanket is prepared that is identical to the blanket of Example 2 except that the pressure sensitive is not applied but a "Reemay" spun bonded polyester fabric having a weight of 0.98 ounces per square yard is laminated to the resilient rubber layer by laminating in a Rotocure press for 9 minutes at 170°C. under 1,000 pounds bonding pressure.

The printing blanket has a modulus of elasticity of $2.7 \times 10^{-7}$ dynes per centimeter, a Bayshore resilience of 43 percent and a permanent set of 2.0 percent. The printing blanket is utilized in an offset printing press and provides a blanket that is durable, does not take a permanent set from smashes in the printing process and provides high quality printing with excellent halftone effects.

What is claimed is:

1. An offset printing blanket consisting essentially of
    a. 3–10 mils of a void-free printing layer of an elastomeric material having a Shore A hardness of 30–60 durometer firmly adhered to
    b. a polyester film about 2–6 mils in thickness having a tensile strength of 20,000 to 180,000 pounds per square inch and firmly adhered to
    c. a soft highly resilient void-free rubber backing layer about 20 to 65 mils thick firmly adhered to
    d. fibrous backing sheet,
wherein the blanket has a modulus of elasticity of 1 to $4 \times 10^{-7}$ dynes per centimeter and a Bayshore Resilience of 30–50 percent measured according to ASTM-D-2632-67 and a permanent set of 1–3 percent measured according to ASTM-395-61 Method A.

2. The printing blanket of claim 1 in which the elastomeric material is an acrylonitrile/butadiene copolymer and the polyester film is a polyethylene terephthalate film.

3. The printing blanket of claim 2 in which the resilient rubber backing layer is an epichlorohydrin rubber.

4. The printing blanket of claim 1 in which a fibrous backing sheet is a woven cotton material firmly adhered to the rubber backing layer with an epichlorohydrin elastomer.

5. The printing blanket of claim 4 in which the fabric backing layer is cotton duck.

6. The printing blanket of claim 3 in which the fibrous backing sheet is a spun bonded non-woven fabric.

7. The printing blanket of claim 6 in which the fibrous backing sheet is a polyester spun bonded non-woven fabric.

8. The printing blanket of claim 1 in which
   a. the void-free printing layer is 4–6 mils in thickness of an elastomeric material of an acrylonitrile/butadiene copolymer having a Shore A hardness of 30–60 durometer;
   b. the polyester film is a polyethylene terephthalate film and 3–5 mils in thickness;
   c. the soft highly resilient void-free rubber backing is an epichlorohydrin rubber having a thickness of 20–40 mils;
   d. a fibrous backing sheet of a spun bonded polyester non-woven fabric.

9. An offset printing blanket consisting essentially of
   a. 4–6 mils of a void-free printing layer of an elastomeric material of an acrylonitrile/butadiene copolymer having a Shore A hardness of 30–60 durometer firmly adhered to
   b. a polyethylene terephthalate film about 2–6 mils in thickness having a tensile strength of 20,000 to 180,000 pounds per square inch and firmly adhered to
   c. a soft highly resilient void-free rubber backing layer of an epichlorohydrin rubber having a thickness of 20–40 mils; and
   d. a pressure sensitive adhesive backing firmly adhered to the rubber backing layer;
wherein the blanket has a modulus of elasticity of 1 to $4 \times 10^{-7}$ dynes per centimeter and a Bayshore Resilience of 30–50 percent measured according to ASTM-D-2632-67 and a permanent set of 1–3 percent measured according to ASTM-395-61 Method A.

10. A process for preparing a printing blanket which comprises:
    a. preparing a laminate by coating a polyester film being 3–6 mils in thickness and having a tensile strength of 20,000 to 180,000 pounds per square inch on both sides with a primer composition and calendaring on one side of the primed polyester film 3–10 mils of elastomeric material having a Shore A hardness of 30–60 durometer;
    b. preparing a second laminate by coating a fibrous backing material with a cement composition and calendaring onto the cement coated fabric 20 to 65 mils of a highly resilient void-free rubber backing layer; and
    c. laminating the layers prepared in steps (a) and (b) above together at 15 to 100 pounds per square inch for about 2 to 20 minutes to about 125°–250°C. to form a printing blanket which has an elastomeric top layer, polyester film inner layer firmly adhered to the resilient void-free rubber backing layer that is in firm adherence to the fibrous backing sheet.

11. The process of claim 10 in which the polyester film is a polyethylene terephthalate film; the elastomeric material is an acrylonitrile/butadiene copolymer; the rubber backing layer is an epichlorohydrin rubber; and the fibrous backing material is a non-woven spun bonded polyester fabric.

* * * * *